(12) United States Patent
Yoshida

(10) Patent No.: US 10,723,808 B2
(45) Date of Patent: Jul. 28, 2020

(54) METHOD FOR PRODUCING CELLULOSE ETHER

(71) Applicant: SHIN-ETSU CHEMICAL CO., LTD., Tokyo (JP)

(72) Inventor: Mitsuhiro Yoshida, Niigata-ken (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/687,026

(22) Filed: Apr. 15, 2015

(65) Prior Publication Data

US 2015/0299338 A1 Oct. 22, 2015

(30) Foreign Application Priority Data

Apr. 22, 2014 (JP) ................................. 2014-088251

(51) Int. Cl.
| | | |
|---|---|---|
| C08B 11/00 | (2006.01) | |
| C08B 11/20 | (2006.01) | |
| C08B 11/08 | (2006.01) | |
| C09J 101/28 | (2006.01) | |
| C08B 1/08 | (2006.01) | |

(52) U.S. Cl.
CPC ................ C08B 11/20 (2013.01); C08B 1/08 (2013.01); C08B 11/00 (2013.01); C08B 11/08 (2013.01); C09J 101/284 (2013.01)

(58) Field of Classification Search
CPC .................................. F26B 17/32; C08B 11/08
USPC ............................... 536/91, 95, 99, 100, 124
See application file for complete search history.

(56) References Cited

U.S. PATENT DOCUMENTS

| | | | | |
|---|---|---|---|---|
| 3,384,974 A | * | 5/1968 | Alleman | .................. C09C 1/58 34/136 |
| 4,245,580 A | | 1/1981 | Okawara | |
| 7,452,928 B2 | | 11/2008 | Hayakawa | |
| 2001/0008048 A1 | | 7/2001 | Gehrmann et al. | |
| 2007/0253915 A1 | | 11/2007 | Brown et al. | |
| 2008/0039621 A1 | * | 2/2008 | Maruyama | .............. C08B 11/08 536/86 |

FOREIGN PATENT DOCUMENTS

| | | | | | |
|---|---|---|---|---|---|
| GB | | 778739 A | * | 7/1957 | .......... C01B 25/425 |
| JP | | 04344090 A | * | 11/1992 | |
| JP | | H05-345801 A | | 12/1993 | |
| JP | H | 2008-259601 A | | 10/1996 | |
| JP | | 2001-233961 A | | 8/2001 | |
| JP | | 2005-239846 A | | 9/2005 | |
| JP | | 3865413 B2 | | 1/2007 | |
| JP | | 2008-073501 A | | 4/2008 | |
| JP | | 2010-047622 A | | 3/2010 | |
| JP | | 2010-132920 A | | 6/2010 | |
| JP | | 2012-211340 A | | 11/2012 | |

OTHER PUBLICATIONS

Hayakawa et al, JP-2010-132920 (A), Jun. 17, 2010, Machine Translated English Language Copy.*
Extended European Search Report for corresponding European Application No. 15163261.9 dated Sep. 17, 2015, 5 pages.
Office Action from corresponding Chinese Patent Application No. 201510187415.9 dated Dec. 16, 2016.
Office Action from corresponding Japanese Patent Application No. 2015085766 dated Jan. 10, 2018, 3 pages.
Office Action for European Application No. 15163261.9 dated Jun. 27, 2018, 4 pages.
Notice of Intention to Grant for European Application No. 15163261.9 dated Sep. 21, 2018.
Indian Office Action, dated Feb. 4, 2020.

* cited by examiner

*Primary Examiner* — Shaojia A Jiang
*Assistant Examiner* — Everett White
(74) *Attorney, Agent, or Firm* — Rimon, P.C.

(57) ABSTRACT

Provided is a method for producing a cellulose ether including a drying step capable of continuously and stably drying a highly adhesive wet cellulose ether with high thermal efficiency without causing adhesive growth and solidification of the wet cellulose ether in a dryer. More specifically, the method for producing a cellulose ether includes a step of drying a wet cellulose ether having water content of more than 50% by weight in a rotary type through-flow dryer.

12 Claims, 1 Drawing Sheet

METHOD FOR PRODUCING CELLULOSE ETHER

FIELD

The present invention relates to a method for producing a cellulose ether to be used, for example, as a binder for drugs or foods, a disintegrant, a thickener for various solvents, a water retention agent for building materials, a binder in the extrusion molding, suspension stabilizers. The method comprises a drying step.

BACKGROUND

A cellulose ether as a final product is usually obtained by comprising the steps of adsorbing alkali metal hydroxide onto cellulose to form alkali cellulose, reacting the alkali cellulose with an alkylating agent or a hydroxylating agent, optionally neutralizing in an addition of acid, and then washing, dehydrating, drying, and grinding.

A wet cellulose ether changes from a soft muddy form to a hard cake form, depending on the dehydration degree in the dehydration step, and has adhesiveness and cohesiveness. For drying of such a muddy or cake-like material, a conductive heat-transfer type agitated trough dryer excellent in thermal efficiency or a convective heat-transfer type pneumatic dryer effective for drying of an adhesive material as shown in JP 2010-132920A is usually employed.

SUMMARY

The above-mentioned wet water-soluble cellulose ether becomes stickier as the water content thereof increases. In the agitated trough dryer, the cellulose ether having water content of more than 50% by weight attaches to a heat transfer part inside the dryer. A decrease in the heat transfer area lowers the drying ability of the dryer and in addition, excessively dried deposits are detached irregularly and mixed into the product as contaminants, thereby deteriorating the quality of the product. In the pneumatic dryer, a required high power makes a drying cost high, and the wet water-soluble cellulose ether having water content of from 70 to 80% or more attaches to the inside of the dryer or connecting pipes, thereby making a stable continuous operation difficult.

With the foregoing in view, the invention has been made. An object of the invention is to provide a method for producing a cellulose ether comprising a drying step capable of continuously drying not only wet water-soluble cellulose ethers but also any of highly sticky wet cellulose ethers without the adhesive growth and solidification inside the dryer and with high stability and good thermal efficiency.

As a result of intensive investigations by the inventor toward the above-mentioned object, it has been found surprisingly that a rotary type through-flow dryer makes it possible to continuously and stably dry a highly sticky wet cellulose ether with high thermal efficiency and without the adhesive growth and solidification of the highly sticky wet cellulose inside the dryer, leading to the completion of the invention.

According to the invention, there is provided a method for producing a cellulose ether comprising a step of drying a wet cellulose ether having water content of more than 50% by weight in a rotary type through-flow dryer.

According to the invention, a wet cellulose ether having high water content and therefore having high stickiness can be subjected to stable continuous drying treatment without adhesive growth and solidification of the wet cellulose ether inside a dryer. This stabilizes the quality of the product because mixing of contaminants derived from excessively dried deposits into the product can be prevented. In addition, frequent cleaning of the inside of the dryer for removing the adhesive deposits therefrom while stopping the operation of the system including the dryer becomes unnecessary. Consequently, an operation rate can be improved and disposal loss of the product due to removal of the deposits can be reduced. Further, deposit removal operations under undesired circumstances in the dryer and a burden on workers can be reduced.

DETAILED DESCRIPTION

Figure 1:
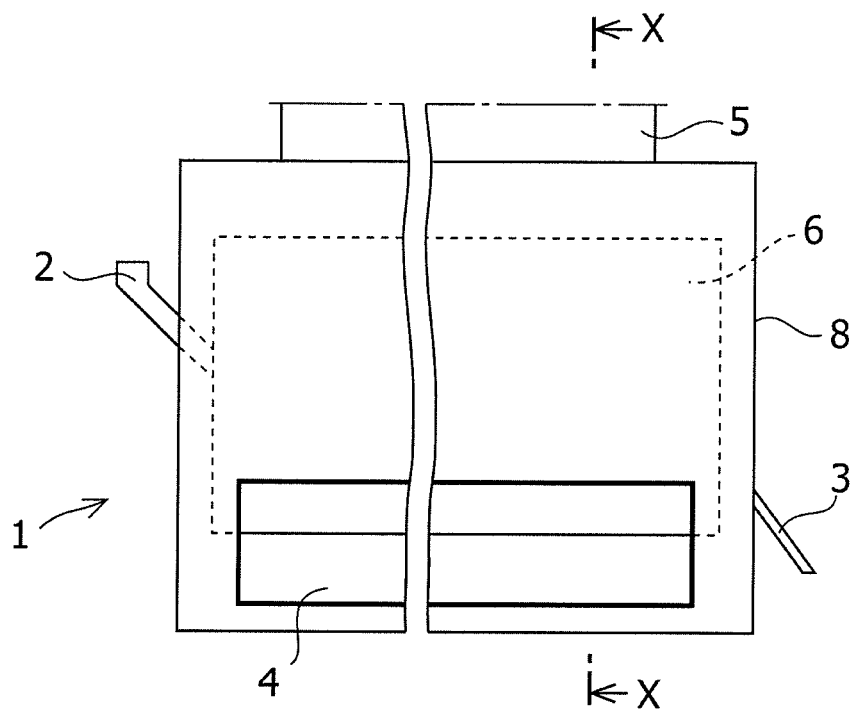
FIG. 1 is a schematic side view of a rotary type through-flow dryer for drying a cellulose ether in accordance with the invention.
Figure 2:
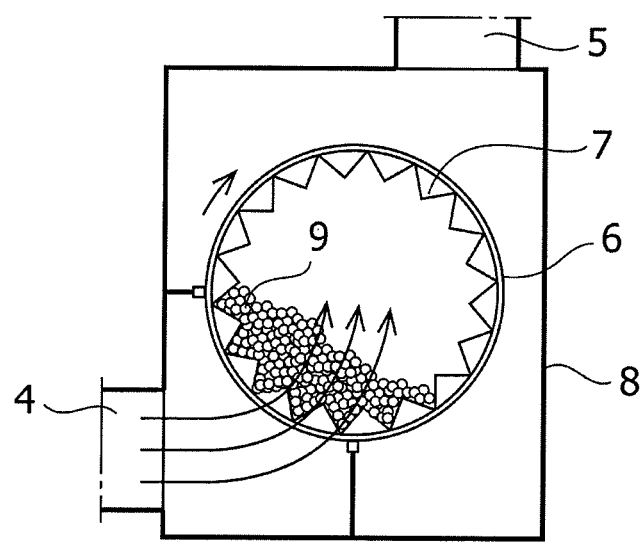
FIG. 2 is a schematic cross-sectional view taken along the line X-X of FIG. 1.

The embodiments of the invention will be described next, but they may be modified without departing from the scope of the technical concept of the invention. The invention will hereinafter be described in detail.

A wet cellulose ether to be dried is not particularly limited insofar as it is a cellulose ether having water content of more than 50% by weight, preferably water content of more than 50% by weight but 90% by weight or lower. Examples of the cellulose ether include water-soluble cellulose ethers such as alkyl celluloses, hydroxyalkyl celluloses and hydroxyalkylalkyl celluloses, and further include low-substituted hydroxypropyl cellulose which is insoluble in water, swell with absorbed water, and have a degree of hydroxypropoxy substitution of from 5 to 16% by weight.

The water content of the wet cellulose ether can be determined by the "Loss on Drying Test" in General Tests of The Japanese Pharmacopoeia, Sixteenth Edition. The water content is not a percentage of water to the cellulose ether but a percentage of water to the sum of the water and the cellulose ether.

The wet cellulose ether is preferably obtained by a method for producing a cellulose ether comprising a step of reacting pulp with an alkali metal hydroxide to obtain alkali cellulose, a step of reacting the alkali cellulose with an etherifying agent to obtain a crude cellulose ether, an optional step of neutralizing the crude cellulose ether in an addition of acid, and a step or steps of washing and dehydrating the optionally neutralized crude cellulose ether. For drying the wet cellulose ether thus obtained, a rotary type through-flow dryer can be preferably used. Accordingly, the method for producing a cellulose ether can further comprise the subsequent step of drying the wet cellulose ether thus obtained with a rotary type through-flow dryer.

The cellulose ether is typically produced by a method comprising the steps of reacting raw material pulp with alkali metal hydroxide to obtain alkali cellulose, reacting the alkali cellulose with an etherifying agent, subsequent washing and dehydration (washing/dehydration), and drying. The step of drying may be followed by an optional step of grinding.

As the pulp, those typically usable as a raw material of a cellulose ether such as wood pulp and linter pulp can be used. The pulp may be in any form of pulp sheet, pulp chips and pulp powder.

The method for producing the alkali cellulose can include a method comprising a step of adding dropwise or spraying an alkali metal hydroxide solution to pulp powder with stirring, and a method comprising the steps of immersing pulp in sheet or chip form in an alkali metal hydroxide solution and dehydrating the immersed pulp.

The alkali metal hydroxide solution is not particularly limited insofar as it can convert the pulp into the corresponding alkali cellulose. From an economical point of view, an aqueous solution of sodium hydroxide or potassium hydroxide is preferred.

The alkali cellulose thus obtained is reacted with an etherifying agent to obtain a crude cellulose ether. The etherifying agent useful for the production of a cellulose ether is known and not particularly limited. Examples of the etherifying agent include alkyl halides such as methyl chloride and ethyl chloride, and alkylene oxides such as ethylene oxide and propylene oxide.

Since the crude cellulose ether which is a reaction product between the alkali cellulose and the etherifying agent contains by-products such as a salt, methanol and propylene glycol, it is washed with at least one of water, preferably hot water of from 70 to 100° C. and steam of atmospheric pressure or higher, and dehydrated. The washing and dehydration are typically carried out continuously by using at least one of a continuous rotary pressure filter, a continuous horizontal vacuum filter, a horizontal table filter and a horizontal belt filter, in combination of at least one of a pressure dehydrator, a vacuum dehydrator, a centrifugal dehydrator and a compression type dehydrator.

The water content of the wet cellulose ether after the step or steps of washing and dehydration is typically more than 50% by weight but not more than 90% by weight in the case of a water-soluble cellulose ether, and typically more than 60% by weight but not more than 90% by weight in the case of low-substituted hydroxypropyl cellulose, from the standpoint of the properties of the cellulose ether, the treatment capacity of washing and dehydration machine and the like.

The wet cellulose ether containing fibers after the step or steps of washing and dehydration changes from a soft muddy form to a hard cake form, depending on the degree of dehydration. The wet cellulose ether becomes stickier, more fibrous and strongly cohesive as the water content increases.

When the wet cellulose ether is low-substituted hydroxypropyl cellulose, a step of neutralizing an alkali remaining in the crude low-substituted hydroxypropyl cellulose by adding an acid such as acetic acid or hydrochloric acid is preferably comprised after the step of reacting the alkali cellulose with an etherifying agent to obtain the crude low-substituted hydroxypropyl cellulose and before the step or steps of washing and dehydrating the crude low-substituted hydroxypropyl cellulose.

Next, the rotary type through-flow dryer will be explained. The rotary type through-flow dryer is known as an example of the dryer capable of drying an adhesive material uniformly without unevenness. The rotary type through-flow dryer is typically useful for drying of granular, small lumpy or flaky materials. Accordingly, a muddy or cake-like, fibrous, and strongly adhesive material like the wet cellulose ether is expected to become a large lump like a snowball as a result of rolling in the drum of the rotary type through-flow dryer. Thus, insufficient drying or uneven drying is expected. However, the present inventors have surprisingly found that the rotary type through-flow dryer makes it possible to carry out continuous drying of a strongly sticky wet cellulose ether stably with high thermal efficiency while preventing adhesive growth and solidification of the cellulose ether inside the dryer.

The rotary type through-flow dryer is a convective heat-transfer type dryer and dries a material placed in a cylindrical rotating drum by allowing hot air to pass through the material and the water or volatile component to evaporate therefrom. The hot air can be brought into contact with the material to be dried by making use of, for example, a parallel flow, a counter flow or a cross flow. The cross flow is preferred from the standpoint of preventing adhesive growth and solidification inside the dryer. The rotating drum of the rotary type through-flow dryer is preferably equipped with a lifter for lifting up the material to be dried so as to increase the drying efficiency. As a result of a kiln action effect by the rotation of the rotating drum, more specifically, as a result of perpendicular rotation and floating movement of the material to be dried, the raw material is dried while being mixed and stirred. The type of lifter is not particularly limited. Examples of the lifter include a triangular type and a louver type.

The invention will hereinafter be described in further detail referring to drawings.

A rotary type through-flow dryer 1 mainly comprises a cylindrical rotating drum 6 having both ends opened and a plurality of vent holes formed on the outer peripheral surface, and a prismatic casing 8 for housing the rotating drum 6 therein. The rotating drum 6 comprises a material inlet 2 at one end and a dried product outlet 3 at the other end in the longitudinal direction. The rotating drum 6 comprises a triangle lifter 7 which is opened at both ends, is in an air-permeable net form and has a triangular shape so as to fit in the inner peripheral surface of the rotating drum 6. The casing 8 has a hot air inlet 4 opened at the lower part of the side surface thereof. The hot air flows through the rotating drum 6 and the triangle lifter 7 upward in the diameter direction via vent holes and is exhausted from the exhaust port 5 at the upper part of the casing 8.

The wet cellulose ether is dried using the rotary type through-flow dryer 1 in the following manner. First, the rotary type through-flow dryer 1 is started to rotate the rotating drum 6, hot air is blown into the rotating drum 6 from the hot air inlet 4, and then the wet cellulose ether, which is a material to be dried, is introduced in the rotating drum 6 from the material inlet 2. The kiln action caused by the rotation of the rotating drum 6 and the triangle lifter 7 allows the material 9 thus introduced in the rotating drum 6 to be transferred successively to the side of the outlet while being mixed and dried uniformly, and then to be discharged from the dried product outlet 3. The hot air passes through the layer of material 9 to be dried from the lower part of the side surface of the rotating drum 6 via the vent holes, flows through the rotating drum 6 and the triangle lifter 7 upward in the diameter direction, and is exhausted from the exhaust port 5. As a result of the synergistic effect of hot air blowing from the vent holes of the rotating drum 6 and a kiln action caused by rotation, the material 9 to be dried is mildly mixed, dried and discharged without adhesive growth and solidification on the inner wall surface of the dryer.

The peripheral speed of the rotating drum is, but not particularly limited to, preferably from 0.01 to 1.00 m/sec, more preferably from 0.1 to 0.5 m/sec from the standpoint of, for example, drying efficiency, the recovery rate of the dried product, and the kiln action effect on mixing and uniform drying.

The hot air temperature is, but not particularly limited to, preferably from normal temperature (20±15° C.) to 175° C., more preferably from 80 to 160° C. from the standpoint of, for example, drying ability and discoloration (quality change) of the material to be dried.

The hot-air blowing rate into the rotating drum, more specifically, an effective supply rate of hot air blown to the effective heat-transfer surface of the side surface of the rotating drum is, but not particularly limited to, preferably from 0.5 to 2.0 m/sec, more specifically from 0.8 to 1.5 m/sec from the standpoint of, for example, drying ability and the recovery rate of the dried product.

The materials of the rotating drum and the lifter are, but not particularly limited to, preferably stainless steel from the standpoint of, for example, excellent corrosion resistance, heat resistance, processability, strength, and further ease of maintenance. The stainless steel surface may be subjected to treatment such as anti-adhesion coating, but it is preferable to avoid coating or the like treatment because a coating material released from the surface may be mixed into the dried product as a contaminant, thereby lowering the quality of the dried product.

The vent hole diameter of the lifter is, but not particularly limited to, preferably from 0.1 to 1.5 mm, more preferably from 0.5 to 1.0 mm from the standpoint of, for example, the recovery rate of the dried product, a pressure loss of blown hot air.

The size of the lifter is not particularly limited. The lifter is preferably provided on the whole inner surface of the rotating drum.

For drying the wet cellulose ether to reduce its water content to an intended degree, primary drying in a rotary type through-flow dryer and then secondary drying in a secondary dryer having thermal efficiency superior to that of the rotary type through-flow dryer result in improvement of thermal efficiency and reduction of the amount of heat medium such as steam necessary for drying, the reduction being preferably by 5% or more, more preferably by 10% or more.

In general, the amount of heat medium used in the step of drying accounts for a very large proportion in the whole amount of heat medium used for the production of the cellulose ether so that the reduction of the amount of heat medium used in the step of drying contributes to decrease in the production cost.

Examples of the secondary dryer include an agitated trough dryer, an agitated cylindrical dryer and a steam tube rotary dryer. From the standpoint of heat efficiency and a filling ratio of the dryer, the agitated trough dryer is preferred. The agitated trough dryer is a dryer where agitation is carried out by heating and rotating a rotor blade in the container, and is described, for example, in JP 2010-132920A.

The water content of the wet cellulose ether introduced in the secondary dryer is preferably from 35 to 50% by weight when it is a water-soluble cellulose ether, and preferably from 40 to 60% by weight when it is low-substituted hydroxypropyl cellulose. When the water content of the water-soluble cellulose ether is less than 35% by weight, or the water content of the low-substituted hydroxypropyl cellulose ether is less than 40% by weight, excessive drying is apt to take place in the dryer, which may cause burning of the dried product. When the water content of the water-soluble cellulose ether is more than 50% by weight, or the water content of the low-substituted hydroxypropyl cellulose is more than 60% by weight, the adhesive growth and solidification of the material to be dried may occur at the heat transfer part inside the dryer, and such decrease in the heat transfer area may lower the drying ability. In addition, the excessively dried adhesive deposit may be released irregularly and mixed into the product as contaminants, which may deteriorate the quality of the product.

In the combination of primary drying in a rotary type through-flow dryer and subsequent secondary drying in a second dryer, as the drying load in the secondary dryer having high thermal efficiency becomes higher, the thermal efficiency becomes higher. When primary drying in a rotary type through-flow dryer is conducted until the water content is reduced to the adhesion limit and then secondary drying in a secondary dryer is conducted, drying with the highest thermal efficiency can be achieved. The term "water content reduced to the adhesion limit" means an upper limit of water content of the wet cellulose ether which causes neither adhesive growth nor solidification inside the secondary dryer in the secondary drying. In other words, it is 50% by weight for the water-soluble cellulose ether and 60% by weight for the low-substituted hydroxypropyl cellulose.

The water content of the cellulose ether thus obtained after the step of drying is preferably 5% by weight or less, more preferably 4% by weight or less.

The invention can be modified in various ways without departing from the scope of the invention and is not limited to the above-described embodiments.

For example, FIG. 1 exhibits the embodiment in which hot air blown into the rotating drum 6 flows through the rotating drum 6 upward in the diameter direction and the exhaust port 5 of the hot air is provided at the upper part of the casing 8, separately from the dried product outlet 3. Alternatively, when the dried product outlet 3 is also used as an exhaust port in the absence of the separate exhaust port 5, the dried product can be pneumatically transported together with hot air so that the system can be simplified, the positional restriction can be relaxed, and the further cost reduction can be achieved.

EXAMPLES

The invention will hereinafter be described on basis of Examples and Comparative Examples. It should not be construed that the invention is limited to or by Examples.

Example 1

Pulp sheet was immersed in a 43% by weight aqueous sodium hydroxide solution, and then pressed to remove the excess aqueous sodium hydroxide solution to obtain alkali cellulose. A weight ratio of the sodium hydroxide component in the alkali cellulose to the solid component in the pulp was 0.55. After 100 parts by weight, in terms of cellulose content, of the alkali cellulose was placed in an internally agitated autoclave and the autoclave was purged thoroughly with nitrogen, 24 parts by weight of propylene oxide was added thereto for the reaction with the alkali cellulose to obtain a crude low-substituted hydroxypropyl cellulose having a degree of hydroxypropoxy substitution of 10.7% by weight (number of moles of substituents per anhydrous glucose unit: 0.25). The crude low-substituted hydroxypropyl cellulose was neutralized by an aqueous 20% by weight hydrochloric acid, washed and dehydrated to obtain, as a material to be dried, a wet low-substituted hydroxypropyl cellulose having water content of 80% by weight.

The material having water content of 80% by weight was dried by using a rotary type through-flow dryer (rotary type through-flow dryer "SRTA-2" produced by OKAWARA MFG. CO., LTD). While the rotating drum was rotated at a peripheral speed of 0.3 msec and hot air of 150° C. was blown into the rotating drum at an effective air supply rate of 1.5 msec, the material was introduced into the drum at 12 kg/h and the dryer was operated for two hours. During the operation, neither adhesive growth nor solidification of the material was observed in the dryer and the dried product had water content of 5% by weight or less, showing stable continuous drying treatment. The rotating drum and triangle lifter used in Example 1 were each made of stainless steel and the triangle lifter had a vent hole diameter of 0.7 mm.

Comparative Example 1

A material having water content of 80% by weight obtained in the same manner as in Example 1 was dried by using an agitated trough dryer ("Paddle Dryer NPD-1.6W" produced by NARA MACHINERY CO., LTD.). While the dryer was heated at a steam pressure of 0.4 MPaG, the material was introduced into the dryer at 12 kg/h and the dryer was operated for 2 hours. The dried product during the operation was 5% by weight or less, but severe adhesive growth and solidification of the material were observed inside the dryer, at the heat transfer part in the vicinity of the place into which the material was introduced, more specifically, at the whole agitating blade.

Comparative Example 2

A material having water content of 80% by weight obtained in the same manner as in Example 1 was dried by using an air turbulence dryer ("Ultrarotor UR-II" produced by Altenburger Maschinen Jaeckering GmbH). While hot air of 150° C. was blown at 15 m$^3$/min, the material was introduced into the dryer at 24 kg/h and the dryer was operated for one hour. The dried product thus obtained had water content of 5% by weight or less, but post-operation inspection in the dryer revealed adhesion to the inner wall and the rotor part of the dryer.

Example 2

A material having water content of 80% by weight obtained in the same manner as in Example 1 was subjected to primary drying by using a rotary type through-flow dryer ("rotary type through-flow dryer "SRTA-2" produced by OKAWARA MFG. CO., LID.). While the rotating drum was rotated at a peripheral speed of 0.3 m/sec and hot air of 150° C. was blown into the rotating drum at an effective air supply rate of 1.5 msec, the material was blown into the drum at 24 kg/h for the primary drying. Then, secondary drying was carried out by using an agitated trough dryer ("Paddle Dryer NPD-1.6W" produced by NARA MACHINERY CO., LID.). While the secondary dryer was heated at a steam pressure of 0.4 MPaG, the primary dried material was introduced into the secondary dryer at 24 kg/h. During the operations, neither adhesive growth nor solidification of the material was observed in the primary and secondary dryers. The primary dried product had water content of 57% by weight and the secondary dried product had water content of 5% by weight or less, showing stable continuous drying treatment.

With regard to the amount of steam used per unit weight of the dried product under the stable operation condition, taking the amount of steam used for drying treatment of using only the rotary type through-flow dryer in Example 1 as 1.00, the amount of steam used in Example 2 was 0.83. Combination of a rotary type through-flow dryer and a conductive heat-transfer type agitated trough dryer having high thermal efficiency resulted in reduction of the amount of steam used.

Example 3

Pulp sheet was immersed in a 49% by weight aqueous sodium hydroxide solution, and then pressed to remove the excess aqueous sodium hydroxide solution to obtain alkali cellulose. A weight ratio of the sodium hydroxide component in the alkali cellulose to the solid component in the pulp was 0.70. After 100 parts by weight, in terms of a cellulose content, of the alkali cellulose was introduced into an internally agitated autoclave and then vacuumed, 115 parts by weight of methyl chloride and 24 parts by weight of propylene oxide were added thereto for the reaction with the alkali cellulose to obtain crude hydroxypropylmethyl cellulose having a degree of hydroxypropoxy substitution of 7.7% by weight and a degree of methoxy substitution of 23.9% by weight. The crude hydroxypropylmethyl cellulose was washed and dehydrated to obtain wet water-soluble hydroxypropylmethyl cellulose having water content of 65% by weight as a material to be dried.

The material having water content of 65% by weight was dried by using a rotary type through-flow dryer ("Rotary type through-flow dryer SRTA-2" produced by OKAWARA MFG. CO., LTD.). While the rotating drum was rotated at a peripheral speed of 0.3 msec and hot air of 150° C. was blown into the rotating drum at an effective air supply rate of 1.5 msec, the material was introduced into the drum at 24 kg/h and the dryer was operated for one hour. During the operation, neither adhesive growth nor solidification of the material was observed in the dryer and the dried product had water content of 5% by weight or less, showing stable continuous drying treatment. The rotating drum and triangle lifter used in Example 3 were each made of stainless steel and the triangle lifter had a vent hole diameter of 0.7 mm.

Comparative Example 3

A material having water content of 65% by weight obtained in the same manner as in Example 3 was dried by using an agitated trough dryer ("Paddle Dryer NPD-1.6W" produced by NARA MACHINERY CO., LTD.). While the dryer was heated at a steam pressure of 0.4 MPaG, the material was introduced into the dryer at 24 kg/h and the dryer was operated for 1 hour. The dried product during the operation had water content of 5% by weight or less, but adhesive growth and solidification of the material were observed inside the dryer, at the heat transfer part in the vicinity of the place into which the material was introduced, more specifically, at the whole agitating blade.

Example 4

A wet water-soluble hydroxypropylmethyl cellulose having water content of 65% by weight obtained in the same manner as in Example 3, as a material, was subjected to primary drying by using a rotary type through-flow dryer ("Rotary type through-flow dryer "SRTA-2" produced by OKAWARA MFG. CO., LTD.). While the rotating drum was rotated at a peripheral speed of 0.3 msec and hot air of 150° C. was blown into the rotating drum at an effective air supply rate of 1.5 m/sec, the material was introduced into the drum at 48 kg/h for the primary drying. Then, secondary drying was carried out by using an agitated trough dryer ("Paddle Dryer NPD-1.6W" produced by NARA MACHINERY CO., LTD.). While the secondary dryer was heated at a steam pressure of 0.4 MPaG, the primary dried material was introduced into the secondary dryer at 48 kg/h. During the operations, neither adhesive growth nor solidification of the material was observed in the primary and secondary dryers. The primary dried product had water content of 44% by weight and the secondary dried product had water content of 5% by weight or less, showing stable continuous drying treatment.

With regard to the amount of steam used per unit weight of the dried product under the stable operation condition, taking the amount of steam used for drying treatment of using only the rotary type through-flow dryer in Example 3 as 1.00, the amount of steam used in Example 4 was 0.79.

The invention claimed is:

1. A method for producing a cellulose ether comprising a step of drying a cake-like and fibrous wet cellulose ether having water content of more than 50% by weight in a rotary type through-flow dryer, wherein the rotary type through-flow dryer is a convective heat-transfer type dryer and dries a material placed in a cylindrical rotating drum by allowing hot air to pass through the material, such that the step of drying comprises passing hot air through the cellulose ether to evaporate water or volatile components therefrom, and subjecting the cellulose either to a perpendicular rotation and floating movement by rotation of the rotating drum such that the cellulose ether is dried while being mixed and stirred, wherein the rotating drum comprises a lifter, and wherein materials of the rotating drum and the lifter are stainless steel, and do not include an anti-adhesion coating.

2. The method for producing a cellulose ether according to claim 1, wherein the step of drying comprises primary drying in the rotary type through-flow dryer and subsequent secondary drying in a secondary dryer different from the rotary type through-flow dryer.

3. The method for producing a cellulose ether according to claim 2, wherein the secondary dryer is an agitated trough dryer.

4. The method for producing a cellulose ether according to claim 1, wherein the wet cellulose ether to be dried in the rotary type through-flow dryer is low-substituted hydroxypropyl cellulose having water content of more than 60% by weight but not more than 90% by weight and has a degree of hydroxypropoxy substitution of from 5 to 16% by weight.

5. The method for producing a cellulose ether according to claim 4, wherein the low-substituted hydroxypropyl cellulose to be dried in the secondary dryer has water content of from 40 to 60% by weight.

6. The method for producing a cellulose ether according to claim 4, further comprising, prior to the step of drying,
a step of reacting pulp with an alkali metal hydroxide to obtain alkali cellulose,
a step of reacting the alkali cellulose with a hydroxypropoxylation agent to obtain a crude low-substituted hydroxypropyl cellulose,
a step of neutralizing the crude low-substituted hydroxypropyl cellulose by an acid, and
a step or steps of washing and dehydrating the neutralized crude low-substituted cellulose ether to obtain the wet cellulose ether.

7. The method for producing a cellulose ether according to claim 6, wherein the acid is acetic acid or hydrochloric acid.

8. The method for producing a cellulose ether according to claim 1, wherein the wet cellulose ether to be dried in the rotary type through-flow dryer is a water-soluble cellulose ether having water content of more than 50% by weight but not more than 90% by weight.

9. The method for producing a cellulose ether according to claim 8, wherein the water-soluble cellulose ether to be dried in the secondary dryer has water content of from 35 to 50% by weight.

10. The method for producing a cellulose ether according to claim 8, wherein the water-soluble cellulose ether is at least one selected from the group consisting of alkyl celluloses, hydroxyalkyl celluloses and hydroxyalkylalkyl celluloses.

11. The method for producing a cellulose ether according to claim 8, further comprising, prior to the step of drying,
a step of reacting pulp with an alkali metal hydroxide to obtain alkali cellulose,
a step of reacting the alkali cellulose with an etherifying agent to obtain a crude cellulose ether, and
a step or steps of washing and dehydrating the crude cellulose ether to obtain the wet cellulose ether.

12. The method for producing a cellulose ether according to claim 11, wherein the etherifying agent is one or more of methyl chloride, ethyl chloride, ethylene oxide, and propylene oxide.

* * * * *